June 29, 1965
O. M. ROBERTS
3,191,889
WING-BODY AIRCRAFT
Filed June 22, 1964
2 Sheets-Sheet 1
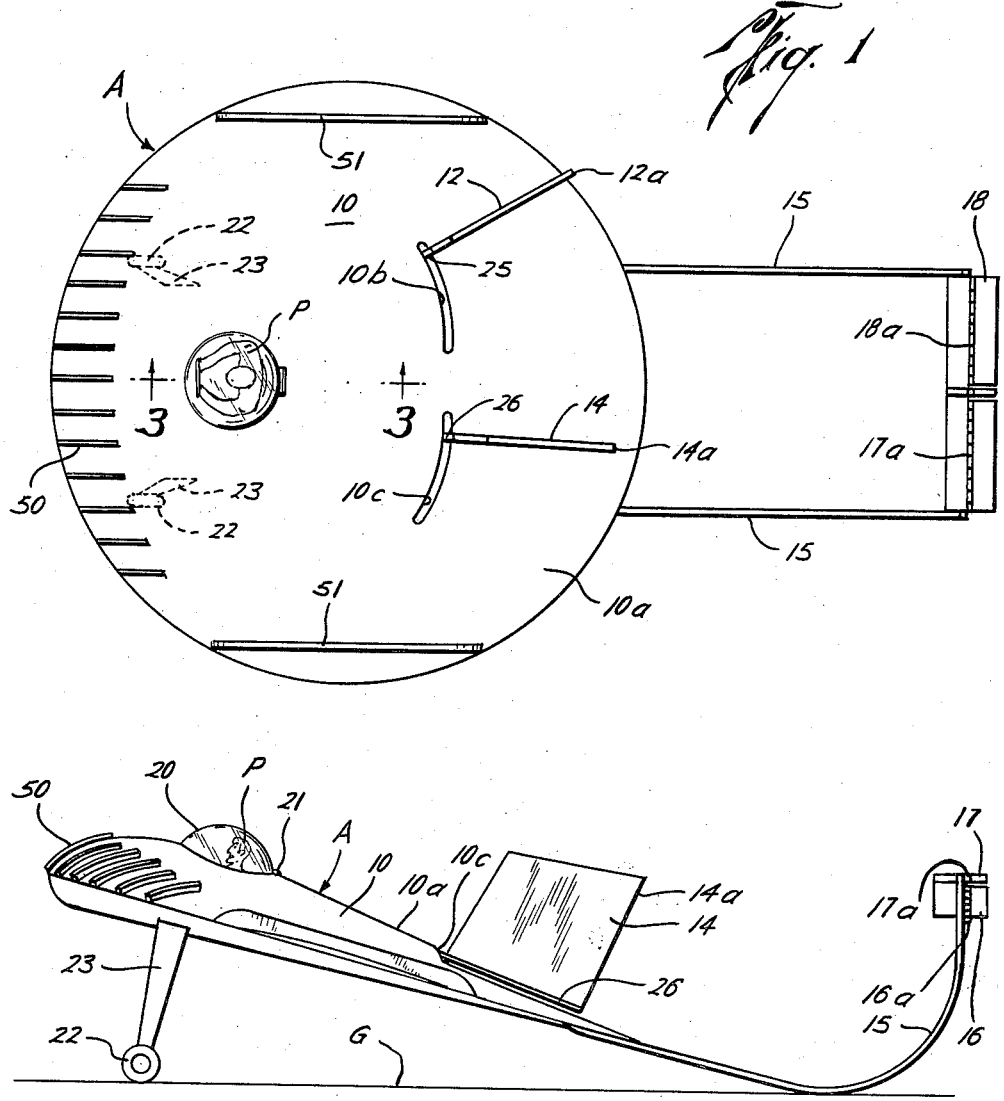
Oran M. Roberts
INVENTOR.
BY Hayden & Pravel
ATTORNEYS

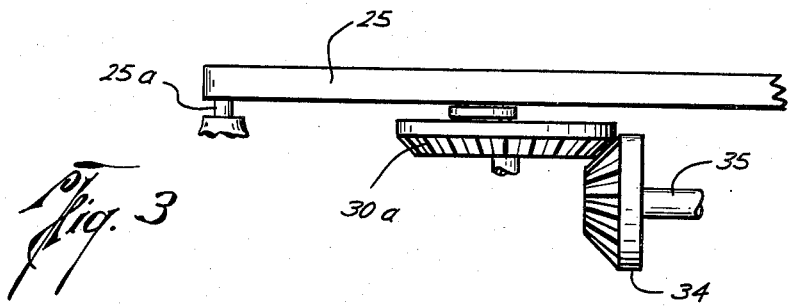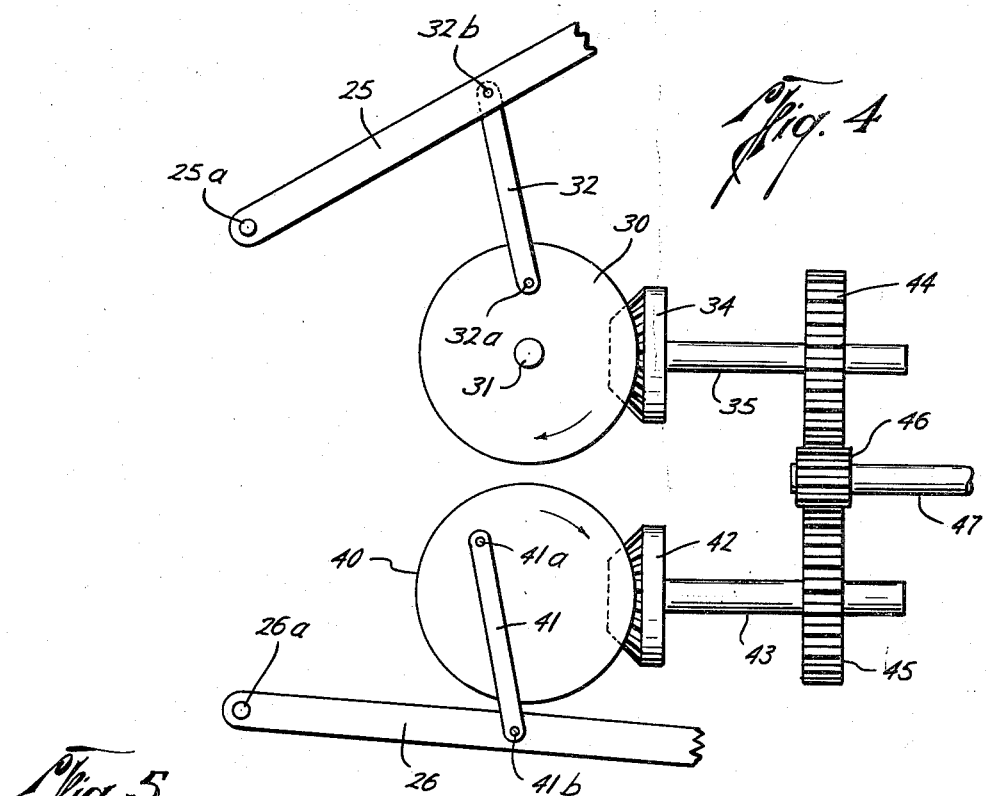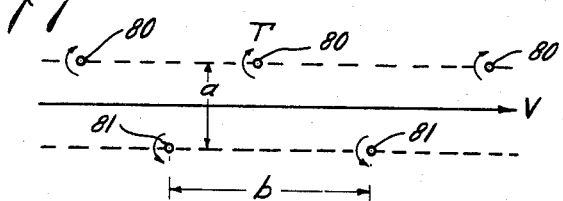

United States Patent Office 3,191,889
Patented June 29, 1965

3,191,889
WING-BODY AIRCRAFT
Oran M. Roberts, Box 3355, Station A, Tyler, Tex.
Filed June 22, 1964, Ser. No. 376,990
7 Claims. (Cl. 244—62)

This invention relates to new and useful improvements in aircraft, and particularly wing-body aircraft.

This application is a continuation-in-part of my co-pending United States patent application Serial No. 297,928, now abandoned.

A general object of this invention is the provision of a novel and improved form of aircraft which is capable of vertical ascent and descent, and which may be constructed in large sizes while still being able to take-off and land on relatively small airfields.

An important object of this invention is to provide a new and improved aircraft having substantially vertically extending fins which are reciprocated or oscillated to provide lift and propelling forces for the aircraft.

Another object of this invention is to provide a new and improved aircraft which is capable of accomplishing sustained hovering.

A further object of this invention is to provide a new and improved aircraft having a wing-body with a pair of oscillating fins mounted thereon at the rear portion for creating a high velocity flow of air over the wing-body to produce lift and thrust forces on the aircraft and without requiring a driving of the aircraft along the ground to obtain the lift force for take-off.

A particular object of this invention is to provide a new and improved aircraft wherein a pair of substantially vertically disposed fins are mounted on the rear portion of a wing-body for coordinated slightly out-of-phase movement to produce lift and propelling forces.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a plan view of the preferred embodiments of this invention;

FIG. 2 is an elevation of the aircraft of this invention when disposed on the ground;

FIG. 3 is a partial sectional view taken on line 3—3 of FIG. 1 to illustrate various details of the preferred construction of this invention;

FIG. 4 is a plan view of the drive mechanism illustrated in FIG. 3 to show further details of such preferred embodiment of this invention; and FIG. 5 is a schematic plan view illustrating longitudinally staggered or unsymmetrical vortices from the laterally reciprocating fins on the aircraft of this invention.

In the drawings, the letter A designates generally the aircraft of this invention which has a wing-body 10 in the preferred embodiment. Briefly, the aircraft A of this invention is provided with lift and propulsion forces by means of laterally movable flaps or fins 12 and 14. As will be more fully explained, such fins 12 and 14 are reciprocated or oscillated laterally over approximately the rear one-half to one-third portion of the upper external surface 10a of the wing-body 10 so as to create an air flow over the entire upper surface 10a of the wing-body 10 in a controlled fashion for the lift and propulsion forces on the aircraft A.

The wing-body 10 may be formed of any conventional material such as an aluminum skin secured to suitable internal framing (not shown). The wing-body 10 preferably has a pair of twin tail booms or rear landing tubes 15 secured thereto. Such tail booms 15 serve as the rear landing gear, and may include a wheel thereon for contact with the ground G, but as illustrated in the drawings, such wheels are not necessary. The tail booms 15 extend upwardly as illustrated and carry therewith a rudder 16 which is pivotally mounted at 16a by a hinge or other pivot means to the twin tail booms 15. A pair of conventional elevators 17 and 18 are pivotally mounted at hinges or pivot pins 17a and 18a, respectively, for individual operation in controlling the pitch and yaw of the aircraft. Likewise, by individually operating the elevators 17 and 18, roll control of the aircraft can be accomplished, as will be well understood by those skilled in the art. Suitable cables are of course utilized for operating the rudder 16 and the elevators 17 and 18 at a point within the wing-body 10.

The controls from the rudder 16, and the elevators 17 and 18 are normally carried through the tail booms 15 to the interior of the wing-body 10 for control by an operator indicated at P in the drawings. The wing-body 10 preferably has a bubble or cover 20 formed of clear plastic or similar material which is pivoted at a hinge 21 or other suitable means to the wing-body 10. The bubble or cover 20 is adapted to be pivoted upwardly to an open position for allowing the pilot P to enter his cockpit or compartment within the wing-body 10. The normal controls for a pilot P are of course provided for the pilot P.

The wing-body 10 has wheels 22, preferably mounted upon retractable landing gear supports 23 for facilitating landing and take-off of the aircraft when desired. However, as will be noted hereinafter, the aircraft A of this invention may take-off and land without requiring ground speed or horizontal movement of the aircraft.

The fins 12 and 14 are illustrated in approximately the proportions which they have in order to create the horizontal propulsion and vertical lift forces for the aircraft A, although it will be appreciated that changes in dimensions of the fins 12 and 14 may be required under certain circumstances for different weights of the aircraft A and different operating conditions. The fins 12 and 14 are carried on control or operating rods or bars 25 and 26, respectively. Such rods 25 and 26 may extend entirely below the fins 12 and 14 as illustrated in FIG. 2 and may be welded or otherwise secured together, but in some instances, the rods 25 and 26 may terminate at the forward ends of the fins 12 and 14, respectively, the manner of connection being within the skill of the art. Such rods 25 and 26 extend through slots 10b and 10c, respectively, formed in the upper external surface 10a of the wing-body 10.

Various drive means or power means may be used for oscillating or reciprocating the fins 12 and 14 on their respective rods 25 and 26, but as illustrated in the drawings, FIGS. 3 and 4 in particular, the forward ends of the rods or bars 25 and 26 are pivotally mounted at 25a and 26a, respectively, within the interior of the wing-body 10. The drive means or power means for pivotally swinging or moving the bars or rods 25 and 26 is also located within the interior of the wing-body 10, and forwardly of the slits or openings 10b and 10c. As illustrated in FIGS. 3 and 4, a bevel gear 30 rotatably mounted on a central pivot pin or shaft 31 is connected to the rod 25 by a crank lever 32 having a pivotal connection to the gear 30 at 32a and a pivotal connection to the bar 25 at 32b. The bevel gear 30 has its gear teeth 30a disposed on its lower surface as best seen in FIG. 3 for meshing with a bevel gear 34 mounted on stub shaft 35.

The control rod or bar 26 is connected to another bevel gear 40 by means of a crank lever 41 having pivotal connections 41a and 41b at each end thereof as best seen in FIG. 4. The bevel gear 40 is preferably identical in construction with the bevel gear 30 and meshes with a driving bevel gear 42 which is mounted for rotation on a stub shaft 43.

In order to provide for coordinated movement of the control arms 25 and 26, the stub shafts 35 and 43 have suitable gearing such as gears 44 and 45, respectively, which are driven by a common gear 46. The gear 46 is mounted on a shaft 47 which is connected to a prime mover such as a gasoline engine of conventional construction. Thus, with the construction of this invention, as illustrated by the preferred embodiment of FIGS. 3 and 4, the prime mover rotates the gear 46 so as to impart counterclockwise rotation to the gears 44 and 45 as viewed from the right side of the drawing. The bevel gears 34 and 42 therefore have a direction of rotation which is counterclockwise as viewed from the right side of the drawing and they impart clockwise rotation to the gears 30 and 40 as viewed in FIG. 4. Since the gears 30 and 40 are driven by the same gearing mechanism through the same power source, they are coordinated so as to rotate at the same rate of speed. The gearing may of course be changed to obtain different speeds of reciprocation for the fins 12 and 14, as desired.

The pivotal connection of the links 32 and 41 with the bevel gears 30 and 40, respectively, is such that the crank arms 25 and 26 are slightly out-of-phase, as shown. Thus, when the fin 12 is at its extreme righthand position (FIG. 1), the fin 14 is either just approaching or just leaving its extreme righthand position. Likewise, when the fin 12 is at its extreme lefthand position, the fin 14 is either just leaving or just approaching its extreme lefthand position. For best results, the fins 12 and 14 should neither be in-phase nor appreciably out-of-phase. In any event, the fins 12 and 14 should not move towards each other for any appreciable extent of their strokes.

When the fins are thus moved in coordinated slightly out-of-phase lateral reciprocating movements, they shed vortices in a manner schematically illustrated in FIG. 5. As shown therein, each dot 80 represents a vortex which has been shed from the fin 12 while each dot 81 represents a vortex which has been shed from the fin 14. Since the fins 12 and 14 are slightly out-of-phase, their shed vortices are out-of-phase and are therefore longitudinally staggered to the rear of the fins 12 and 14. The vortices are not actually shed in a straight line as shown in FIG. 5, but instead each fin sheds a vortex at each end of its stroke, but for purposes of illustration, the vortices 80 and 81 are shown in straight lines since the vector resulting is in a straight line.

In order to get the maximum thrust force on the body, the natural period of vibration or oscillation of the fins 12 and 14 should be in resonance with the frequency of the vortex formation (FIG. 5) created by the fins 12 and 14. The alternate vortices created by the fins 12 and 14, in their longitudinally staggered relationship (FIG. 5) constitutes what is known as a stable Von Karman vortex street if arranged according to the expression:

$$\frac{a}{b} = \frac{1}{\pi} \cosh-1\sqrt{2} = 0.2806$$

where:

$a$=distance between vortices in adjacent paths
$b$=distance between vortices in same path (see FIG. 5)

The equation for the velocity of the vortex system is:

$$v = \frac{\Gamma}{b\sqrt{8}}$$

where:

$v$=velocity of the vortex system (air being moved by vortices)
$\Gamma$=speed of field flow in each vortex (see FIG. 5)

In propelling the body 10 forwardly, the shed vortices thus exert a force component on the fins 12 and 14 which is absorbed thereby and transmitted to the body 10, the velocity of which is related to the lateral reciprocation velocity of the fins 12 and 14 and their natural resonance as reflected by the above formulas.

It is important in this invention that the air flow over approximately the rear one-half to one-third of the wing-body 10 be of an unsteady nature. Unsteady air flow is accomplished in this invention by wave-like reciprocating oscillatory movement of the two movable vertical fins or flaps 12 and 14. It is to be noted that the lower edges of the fins or flaps 12 and 14 conform in shapes substantially to the external surface of the portion of the wing-body 10 over which they move.

The flow of the air over the wing-body is naturally unsteady in this invention because of the reciprocating motion of the vertical flaps 12 and 14. When the flaps or fins 12 and 14 are moved with a faster motion, up to a certain maximum frequency, a correspondingly greater lift force is produced, which is very nearly logarithmic. Conversely, as the motion or speed of movement of the fins 12 and 14 begins to slow down in frequency, the lift force will decrease due to the decrease in the general circulation of air flow with its corresponding rise in pressure above the wing-body 10. An object of the movement of the fins 12 and 14 is to prevent steady flow conditions at the rear portion of the wing-body since steady flow conditions are accompanied by greater friction than if the flow is unsteady. At the same time, surface roughness is much less of a factor insofar as drag is concerned if the flow of the air across rear one-half to one-third of the wing-body 10 is unsteady. The above described movements of the fins 12 and 14 of the present invention give rise directly to the unstable flow and the periodic shedding of vortex eddies and wave currents for producing the horizontal propulsion and the vertical lift for the flight movements of the aircraft A. For hovering flight, the speed of movement of the fins 12 and 14 is of course reduced to provide the lift force without producing any substantial horizontal propulsion.

It has been found also that the flow of air across the upper external surface 10a of the wing-body 10 is facilitated by small fences 50 disposed at the forward end or portion of the wing-body 10. Such fences 50 are parallel to each other as illustrated and assist in producing a stabilized flow of air across the forward one-half or two-thirds of the wing-body 10 while the air at the rear one-half to one-third portion of such wing-body 10 is of an unsteady type. Also, end plate fences 51 are preferably provided on each side or end of the wing-body 10 for air flow stabilization. The movement of the fins 12 and 14 is such that it actually draws the air across the entire airfoil surface provided by the upper external surface 10a to produce a reduced pressure and therefore a lift force from the atmospheric or free stream air to provide a lifting for the aircraft.

It should be noted that the rear edge 12 and 14a of the fins 12 and 14, respectively, are angled downwardly and forwardly from a truly vertical position in flight to produce a downward or horizontal thrust component to facilitate lifting and propulsion of the aircraft A.

It should be emphasized that the force of gravity is negligible on the operation of the vertical flaps 12 and 14 of this invention, in contrast to that used in ordinary flapping flight as by birds and insects. Whereas an ornithopter type of aircraft has to work against the force of gravity on the upstroke portion of the wing-beat, in this aircraft A, such force is for practical purposes greatly reduced. The fact that the vertical fins 12 and 14 are vertical, or substantially vertical, nullifies the large force of gravity found in the horizontal flap-wing. The initial wind resistance remains the same whether vertical, oblique, or horizontal plane of reference positions are used. In an orthopter, most of the lift is produced on the down-stroke of the wing, whereas with the aircraft of this invention, the whole stroke produces useful work as lift and thrust during the entire cycle.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A wing-body aircraft, comprising:
   (a) a wing-body having an upper external surface,
   (b) at least one upright fin having a rear edge which is angled downwardly and forwardly in flight,
   (c) said fin also having a lower edge disposed in close proximity to the portion of the external upper surface of the wing-body over which it moves,
   (d) pivotal mounting means connected to the forward portion of said fin for laterally swinging said fin across a portion of said upper external surface of said wing-body, and
   (e) power means for effecting lateral swinging of said fin about said pivotal mounting means for horizontal propulsion and lifting of the aircraft.

2. A wing-body aircraft, comprising:
   (a) a wing-body having an upper external surface,
   (b) at least one upright fin having a substantially vertically extending rear edge which is angled downwardly and forwardly in flight,
   (c) said fin also having a lower edge conforming generally in shape to the portion of the external upper surface of the wing-body over which it moves,
   (d) said lower edge being disposed in close proximity to the portion of the external upper surface of the wing-body over which it moves,
   (e) pivotal mounting means connected to the forward portion of said fin,
   (f) said pivotal mounting means being disposed on a substantially vertical axis for laterally swinging said fin across a portion of said upper external surface of said wing-body, and
   (g) power means for effecting a reciprocating pivotal swinging of said fin for horizontal propulsion and lifting of the aircraft.

3. A wing-body aircraft, comprising:
   (a) a wing-body having an upper external surface,
   (b) said wing-body having a slot formed therein,
   (c) at least one fin disposed over the rear portion of the external upper surface of the wing-body.
   (d) a pivot arm lever connected to said fin and extending through said slot to the interior of the wing-body,
   (e) pivot means connected to said lever within the interior of the wing-body for lateral pivotal movement of said fin relative to said wing-body, and
   (f) power means for effecting a reciprocating pivotal swinging of said fin for horizontal propulsion and lifting of the aircraft.

4. A wing-body aircraft, comprising:
   (a) a wing-body having an upper external surface,
   (b) at least one fin having a substantially vertically extending rear edge which is angled downwardly and forwardly in flight,
   (c) said fin also having a lower edge conforming generally in shape to the portion of the external upper surface of the wing-body over which it moves,
   (d) said lower edge being disposed in close proximity to the portion of the external upper surface of the wing-body over which it moves,
   (e) said wing-body having a slot formed therein,
   (f) a pivot arm lever connected to the forward portion of said fin and extending through said slot to the interior of the wing-body,
   (g) substantially vertical pivot means connected to said lever within the interior of the wing-body for lateral pivotal movement of said fin relative to said wing-body,
   (h) power means for effecting a reciprocating pivotal swinging of said fin for horizontal propulsion and lifting of the aircraft.

5. A wing-body aircraft, comprising:
   (a) a wing-body having an upper external surface,
   (b) a pair of upright fins disposed over the rear portion of said upper external surface of said wing-body, and
   (c) drive means for oscillating said fins in coordinated slightly out-of-phase lateral movements over said rear portion of said upper external surface for creating lift and propulsion forces on the wing-body of the aircraft.

6. A wing-body aircraft, comprising:
   (a) a wing-body having an upper external surface,
   (b) flight control means including elevators and a rudder connected to said wing-body,
   (c) a pair of upright fins disposed over the rear portion of said upper external surface of said wing-body, and
   (d) drive means for oscillating said fins in coordinated slightly out-of-phase lateral movements over said rear portion of said upper external surface for creating lift and propulsion forces on the wing-body of the aircraft.

7. A wing-body aircraft, comprising:
   (a) a wing-body having an upper external surface,
   (b) a pair of upright fins disposed over the rear portion of said upper external surface of said wing-body,
   (c) pivotal mounting means connected to the forward portion of each of said fins for laterally swinging said fins across a portion of the upper external surface of said wing-body, and
   (d) drive means for oscillating said fins in coordinated slightly out-of-phase lateral movements over said rear portion of said upper external surface for creating lift and propulsion forces on the wing-body of the aircraft.

References Cited by the Examiner

UNITED STATES PATENTS 1,735,308  11/29  Worrell _____ 244—13

FOREIGN PATENTS 101,928  11/23  Switzerland.
704,339  2/31  France.

FERGUS S. MIDDLETON, *Primary Examiner.*

MILTON BUCHLER, *Examiner.*